US006728795B1

(12) United States Patent
Farazmandnia et al.

(10) Patent No.: US 6,728,795 B1
(45) Date of Patent: Apr. 27, 2004

(54) DMA CHANNEL FOR HIGH-SPEED ASYNCHRONOUS DATA TRANSFER

(75) Inventors: Farshid Farazmandnia, Laguna Niguel, CA (US); Michael O. Chandler, Corona Del Mar, CA (US); Richard A. Ward, Santa Ana, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/550,852

(22) Filed: Apr. 17, 2000

(51) Int. Cl.[7] .................. G06F 13/28; G06F 3/00; G06F 13/32
(52) U.S. Cl. ................. 710/22; 710/25; 710/29; 710/32; 710/53; 710/58; 709/512; 713/500
(58) Field of Search ................ 379/1; 375/354; 710/52, 22, 25, 29, 30, 32, 33, 53, 56, 57, 58, 59

(56) References Cited

U.S. PATENT DOCUMENTS

| | | | | |
|---|---|---|---|---|
| 5,708,659 A | * | 1/1998 | Rostoker et al. | 370/392 |
| 5,794,070 A | | 8/1998 | Rabe et al. | |
| 5,912,752 A | * | 6/1999 | Mollett et al. | 359/137 |
| 5,958,024 A | | 9/1999 | Typaldos et al. | |
| 6,055,578 A | * | 4/2000 | Williams et al. | 709/253 |
| 6,105,086 A | * | 8/2000 | Doolittle et al. | 710/52 |
| 6,157,972 A | * | 12/2000 | Newman et al. | 710/100 |
| 6,230,255 B1 | * | 5/2001 | Asghar et al. | 712/32 |
| 6,425,021 B1 | * | 7/2002 | Ghodrat et al. | 710/22 |

FOREIGN PATENT DOCUMENTS

| | | | | | |
|---|---|---|---|---|---|
| JP | 63262716 A | * | 10/1988 | | G06F/3/05 |
| JP | 05028093 A | * | 2/1993 | | G06F/13/28 |
| JP | 2000009861 A | * | 1/2000 | | G04F/3/00 |

* cited by examiner

Primary Examiner—Jeffrey Gaffin
Assistant Examiner—Angel L Casiano
(74) Attorney, Agent, or Firm—Thomas, Kayden, Horstemeyer & Risley, LLP

(57) ABSTRACT

An apparatus and method for transferring high speed asynchronous data using a DMA controller. By using a conventional Universal Serial Asynchronous Receiver Transmitter (USART) with a small buffer, high speed asynchronous data can be manipulated by the DMA controller by use by other applications, such as wireless communication applications. The wireless communication applications includes Global System for Mobile communications (GSM), Code Division Multiple Access (CDMA), or Personal Digital Cellular (PDC). These wireless communication applications utilize high asynchronous data rates that would require more expensive USART with additional buffer capacity. In the receive mode, the high speed asynchronous data shifted into a DMA FIFO buffer from the USART. The data is then flushed into a host memory, such as a protocol stack by the DMA controller once the FIFO is full or if a timer expires. The data in the protocol stack is then manipulated by the wireless communication application. In the transmit mode, the high speed asynchronous data is similarly manipulated to provide data from the protocol stack to the USART.

The present invention utilizes conventional hardware thus reducing cost and use of chip real estate.

47 Claims, 7 Drawing Sheets

DMA CHANNEL FOR HIGH-SPEED ASYNCHRONOUS DATA TRANSFER

BACKGROUND

1. Field of the Invention

The present invention relates to an apparatus for communication devices, in particular a DMA controller used for asynchronous data transfers of wireless communication data; such as Global System for Mobile communications (GSM), Code Division Multiple Access (CDMA), Personal Handy phone System (PHS) and Personal Digital Cellular (PDC).

2. Description of the Related Art

Recent advances in wireless communications have led to an explosion of cellular telephones. New telephones come in all shapes and sizes. Although the cellular phones come in different shapes and sizes, they generally share common elements such as a keypad, a display, an antenna and communication logic. What the cellular phones do not typically share however is the different global wireless communication standards that it must operate under.

The differing global wireless communication standards are typically determined by the wireless communications carrier, such as GTE Mobile (USA), SprintPCS (USA), AT&T Wireless (USA) and NTT Mobile (Japan). The differing communication standards include GSM, CDMA, PHS and PDC. The standards generally differ in multiplexing techniques, and operation frequencies. To accommodate the different standards, wireless phone manufacturers incorporate hardware and software that may be adaptable for the differing standards.

The hardware and software of the wireless telephone transmits and receives communication data. The wireless communication data is typically asynchronous and high speed in nature. Thus the hardware and software of the wireless telephone should be able to process the high speed asynchronous data.

Traditionally, a Universal Synchronous Asynchronous Receiver Transmitter (USART) is used to transmit and receive data. Traditional USARTs typically include one or two bytes of transmit or receive buffer memory. Although USARTs with more buffer memory are available, they generally are more expensive and will take more real estate on the silicon chip. As one skilled in the art is aware, chip real estate is at a premium. To adhere to the communications standards, the wireless telephone needs to be able to process the high speed asynchronous data. The use of the traditional USART generally would require more CPU power to process the high speed asynchronous data.

SUMMARY OF THE INVENTION

Briefly, an apparatus and method of a communications device, such as a wireless telephone for transferring high speed asynchronous data is disclosed. The apparatus includes a DMA controller, a DMA FIFO memory, timers, and a USART. The high speed asynchronous data is transmitted to and from the USART. The USART typically includes a small transmit and receive buffer, typically a one or two bytes buffer.

When the wireless telephone is in the receive mode, the asynchronous data is received by the USART. As the USART receive buffer receives data, the data is then transferred to a DMA FIFO. The size of the DMA FIFO can be any size, but preferably is eight bytes in size. Once the DMA FIFO is filled, data is then transferred to the DMA controller. The DMA controller will then transfer the data over a bus, such as a PCI bus, to a host memory. The data in host memory can be manipulated depending upon the communication standard configured for the wireless telephone. Since the data is asynchronous in nature, it is not certain whether or not data will be received by the USART to be processed by the DMA. Further, since the various communications standards may require a particular response to the incoming data in a time certain, the data should be processed within the time certain.

One of the bytes of the eight-byte DMA FIFO is a status byte. The status byte indicates the number of valid bytes in the DMA FIFO. Thus, should it be necessary to transfer to the DMA controller prior to the DMA FIFO having seven valid data bytes, the status byte will contain the number of bytes that are valid in the DMA FIFO. Should a timer expire, the data will be flushed from the DMA FIFO via the DMA controller for transfer to the host memory over a bus, such as a PCI bus.

When the wireless telephone is in the transmit mode, data from the host memory is transferred over a bus, such as a PCI bus to the DMA FIFO via a DMA controller. As previously discussed, one of the bytes is the status byte. The status byte includes information regarding the number of valid bytes in the DMA FIFO. The data in the DMA FIFO is then transferred to the USART transmit buffer for transmission. As previously discussed, if a timer expires, an interrupt is sent to the host memory so that data can be transferred via the DMA controller to the DMA FIFO.

In another embodiment, for GSM applications, two timers are included. The application of the first timer is similar to the description of the timer set forth above. The second timer is used in the GSM application, so that the wireless telephone can respond within a very short amount of time should it receive control data as part of the asynchronous data input. Since the wireless telephone needs to respond to the control data within a time certain, should the second timer expire, the second timer sends an interrupt to the host memory so that the data can be transferred by the DMA controller to the DMA FIFO for transmission by the USART.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
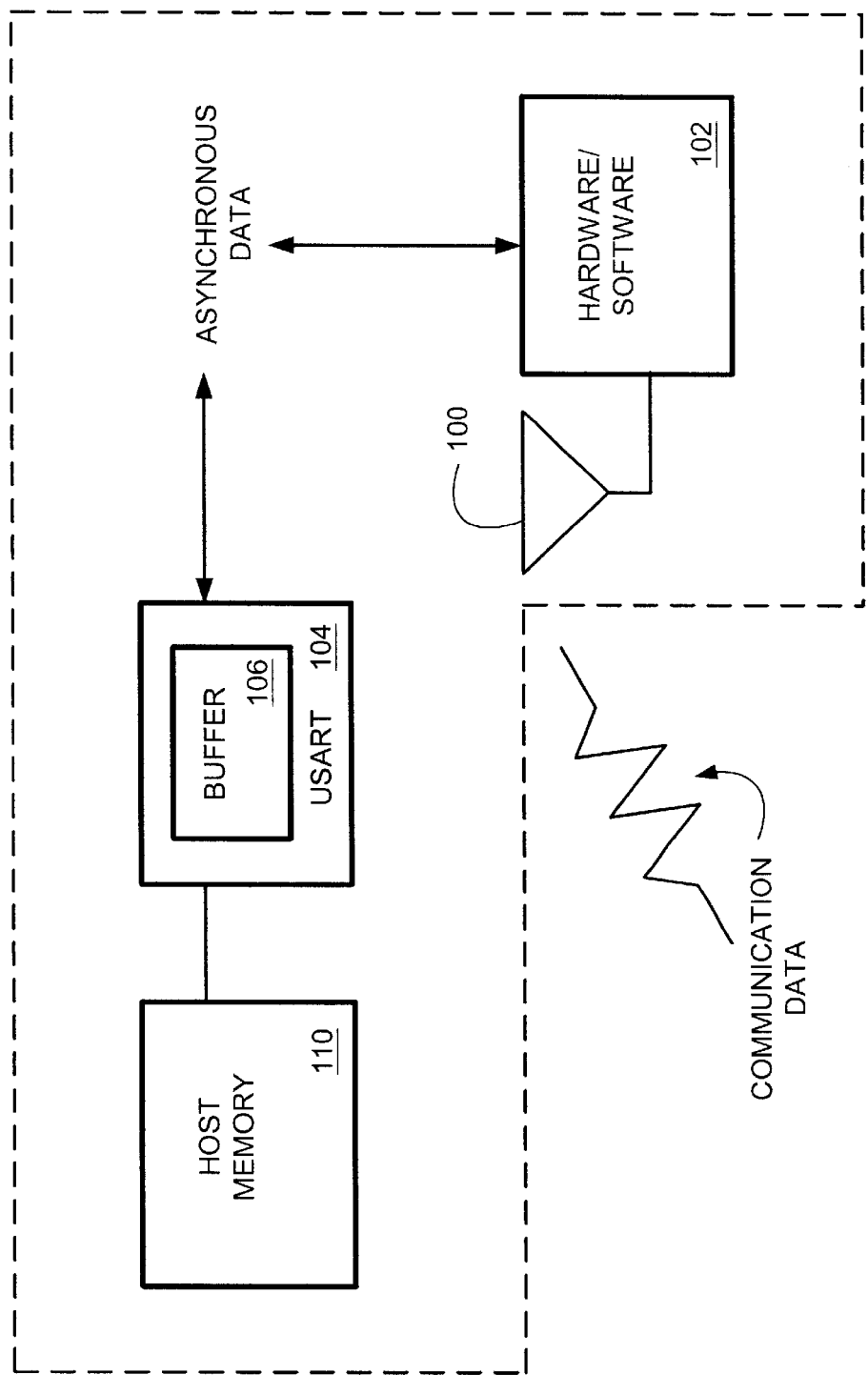
FIG. 1 is a block diagram of a receiver/transmitter.

Turning now to the drawings, FIG. 1 illustrates a prior art system for processing asynchronous data in a communications device. The asynchronous data is transmitted or received by an antenna 100. The asynchronous data is then modulated or demodulated by hardware and software denoted by box 102. That is, if the communication device C is in the transmit mode, the hardware and software denoted by the box 102 modulates the data for transmission by the antenna 100. If the communication device C is in the receive mode, the hardware and software denoted by the box 102 demodulates the data for further processing.

As shown in FIG. 1, the box 102 is coupled to a USART 104. If the communication device C is in the receive mode, the asynchronous data is stored in a buffer 106. In prior systems, the asynchronous data is written into a host memory 110 such as a protocol stack by a central processing unit (CPU). Further, the asynchronous data is read from the host memory 110 and written into the buffer 106 by read and write commands of the CPU. Since the asynchronous data is high speed in nature, the processing power required to transfer the data between the host memory 110 and the USART 104 can be substantial. The data in the host memory 110 can then be manipulated by software for further processing.

Figure 2:
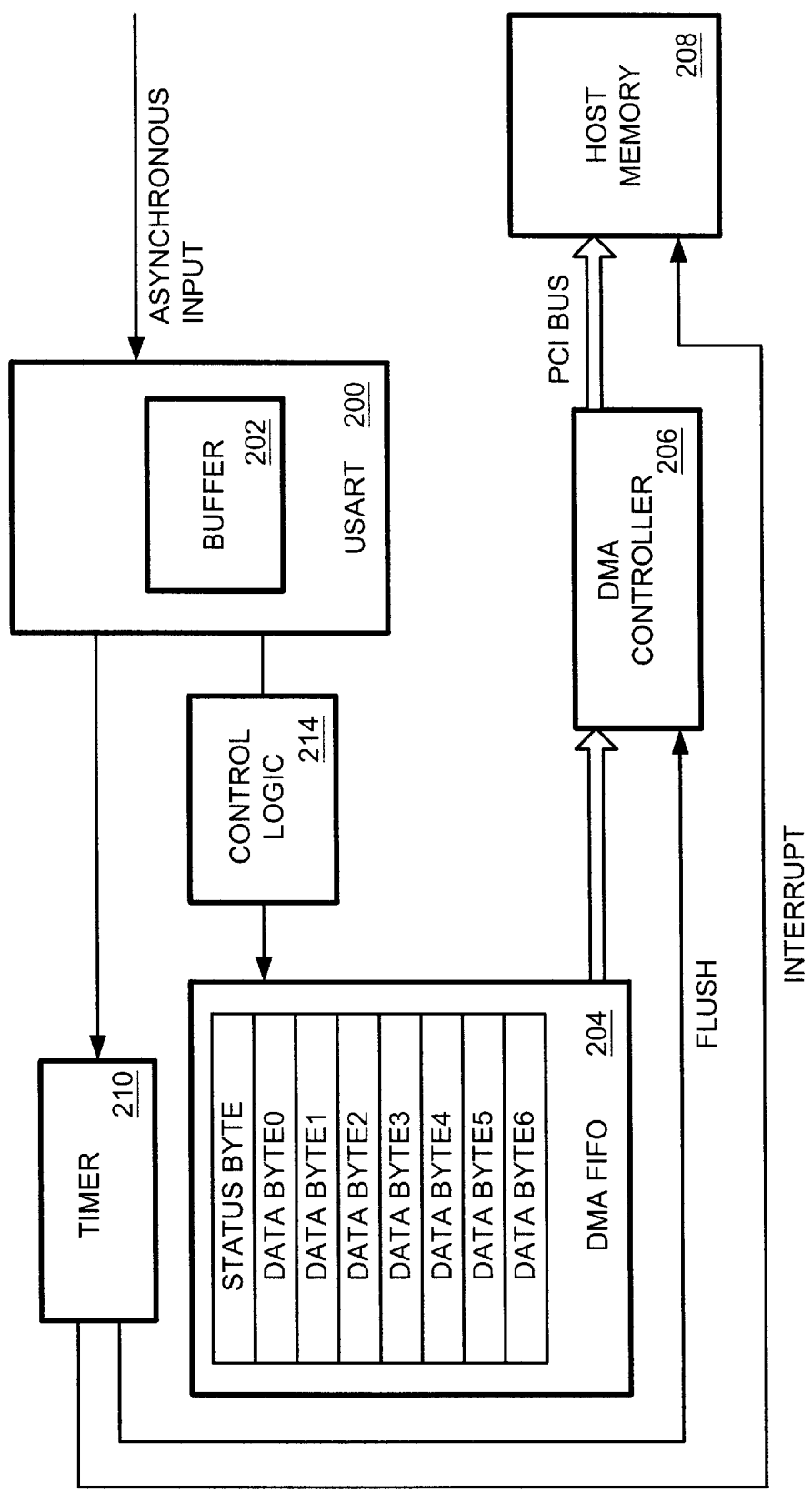
FIG. 2 is a block diagram of a communication system in a receive mode according to the present invention.

FIG. 2 is one embodiment of the present invention when a communication device C is in a receive mode. Asynchronous data is inputted into a USART 202 coupled to an antenna (not shown). Generally, the USART 200 includes a small buffer 202. The buffer 202 is typically one or two bytes in size. The use of a small buffer USART 200 typically saves chip real estate and is also typically inexpensive. The USART 200 is also coupled to a timer 210 and a DMA FIFO 204. The DMA FIFO 204 can be any size, but as shown in this embodiment, the DMA FIFO 204 is 8 bytes in size. As the asynchronous data is stored in the buffer 202 of the USART 200, the USART 200 provides a reset signal to the timer 210. Furthermore, the asynchronous data is shifted into the DMA FIFO 204 from the buffer 202. Once the capacity of the DMA FIFO 204 is filled with x valid bytes (or perhaps some lower threshold), the data from the DMA FIFO 204 is transferred over a bus, such as a PCI bus by a DMA controller 206 to a host memory 208 or protocol stack. Preferably, the size of the DMA FIFO 204 is 8 bytes, thus x is less than or equals 7 (8 bytes total, with 1 status byte). Thereafter the data in the host memory 208 can be further processed depending upon the communication standard, such as CDMA, PHS or PDC.

Since it is typically necessary to process the asynchronous data as soon as possible, and since it is unknown whether the data will be received since the data is asynchronous in nature, should the timer 210 expire, the timer 210 provides a flush signal to the DMA controller 206. The timer 210 is programmable, with typical expiration times of 20 to 200 ms for CDMA, PHS and PDC applications. Concurrently, the timer 210 provides an interrupt to the host memory 208. At that time, the asynchronous data is transferred from the DMA FIFO 204 to the host memory 208 by the DMA controller 206. As noted above, since the data is asynchronous in nature, it is possible that all of the data bytes in the DMA FIFO 204 may not be occupied by the asynchronous data. Therefore, a status byte is included in the DMA FIFO 204 to indicate which data bytes are valid. A control logic 214 provides a number count of valid data bytes to be stored for the STATUS BYTE in the DMA FIFO 204. For example, should three data bytes be received by the DMA FIFO 204 by the time the timer 210 expires, the status byte will indicate that only three of the seven data bytes are valid and have a value of ØxØ7. As discussed previously, the size of the DMA FIFO is not limited to 8 bytes, but is preferably 8 bytes. The number of data bytes that would be transferred from the DMA FIFO 204 is up to the number identified in the STATUS BYTE.

Figure 3:
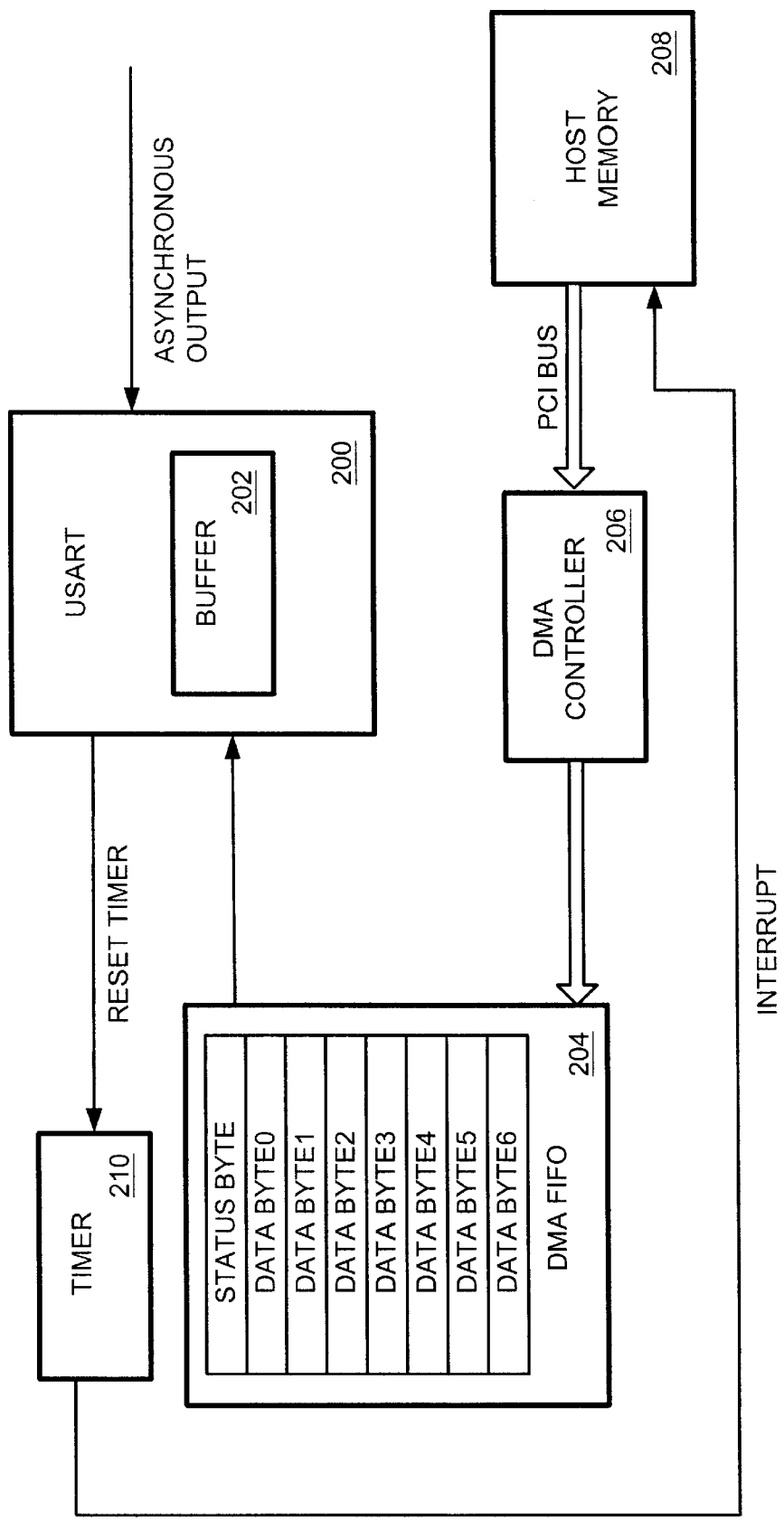
FIG. 3 is a block diagram of a communication system in a transmit mode according to the present invention.

Next, in FIG. 3 an embodiment of the present invention is disclosed when the communication device C is in the transmit mode. When a timer 210 sends an interrupt to a host memory 208, data from the host memory 208 is transferred to the DMA FIFO 204 by a DMA controller 206 over a bus, such as a PCI bus. The timer 210 is programmable with expiration times of 20 to 200 ms for CDMA, PHS, and PDC applications. The data in the DMA FIFO 204 is then shifted into a buffer 202 of a USART 200 for transmission via an antenna (not shown). As the data is received by the USART 200 from the DMA FIFO 204, the USART 200 resets the timer 210. As mentioned above, one of the bytes of the DMA FIFO 204 is a STATUS BYTE. The status byte provides information regarding the number of valid bytes in the DMA FIFO.

Figure 4:
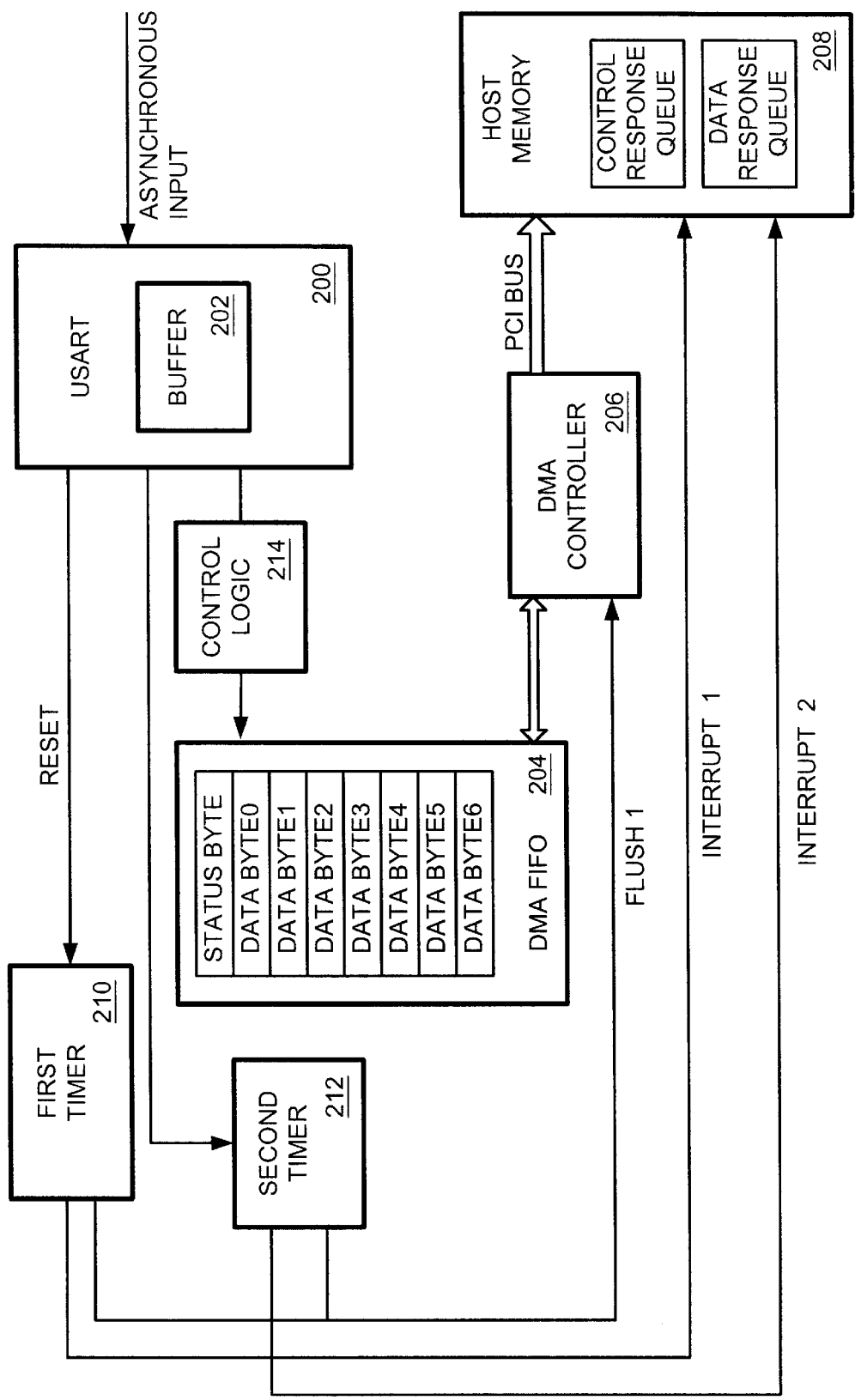
FIG. 4 is a block diagram of a communication system in a GSM mode according to the present invention.

A further embodiment of the present invention for GSM application is disclosed in FIG. 4. The GSM communication standard specifies that control and data can be transmitted over a single channel. To meet the GSM standard, the communication device C generally is required to respond to a control byte over the single channel within a time certain. The time certain can be less than 20 ms. There are some GSM standards that require the response time to be within a three byte time frame. Thus, for example, if the communication device C receives the first byte of a control frame, a response is required within 2 bytes. Thus a decision needs to be quickly made regarding whether the incoming asynchronous data is either data or control. The identification of the type of data is located in the first byte of an incoming frame. Thus, the communication device C typically needs to identify the type of incoming asynchronous frame and respond to the asynchronous data if the asynchronous data is a control frame.

For GSM applications, a second timer 212 is coupled between the USART 200, the DMA FIFO 204 and the host memory 208. The second timer 212 is used in addition to a first timer 210. The first timer 210 operates similarly to the timer used in CDMA, PHS and PDC applications. Once the asynchronous data is received in the USART 200 via an antenna (not shown), the USART 200 provides a timer reset signal to the second timer 212. Subsequently, the second timer 212 initiates an interrupt 2 to the host memory 208. Once the host memory 208 receives the interrupt 2, the host memory 208 issues a request to the DMA controller 206 to transfer the data from the DMA FIFO 204 to the host memory 208 over a bus, such as a PCI bus. A status byte of the DMA FIFO 204 provides information regarding the number of valid bytes in the DMA FIFO 204. A control logic 214 provides a number count of valid data bytes for the STATUS BYTE. For example, if four bytes are received when the timer expires, the status bytes of the DMA FIFO 204 will generally be ØxØF.

Figure 5:
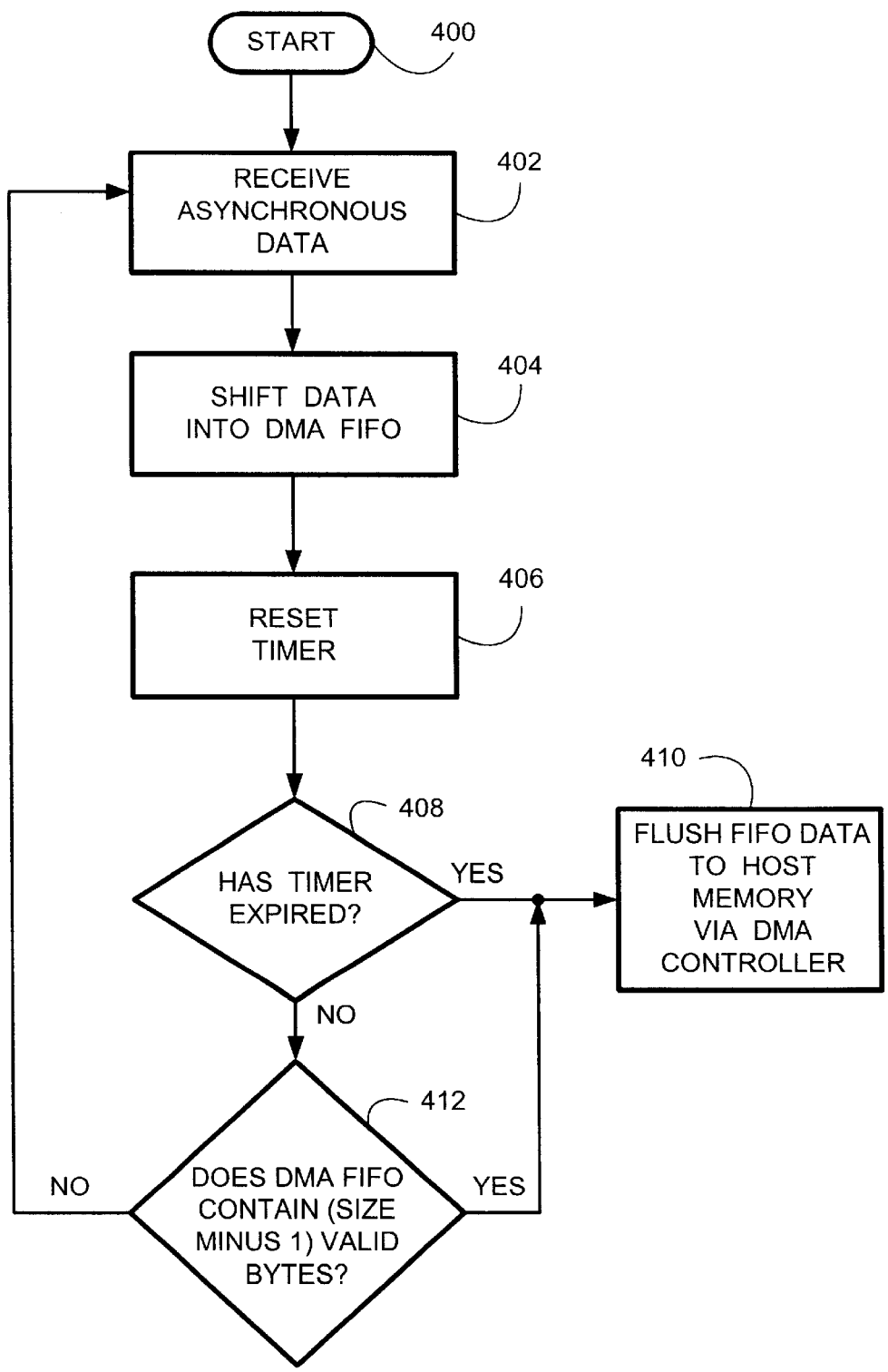
FIG. 5 is a flowchart for receiving asynchronous high speed data according to the present invention.

FIG. 5 is a flowchart for receiving high speed asynchronous data using a DMA controller, for wireless communication's applications such as CDMA, PHS and PDC. The method starts at step 400. A USART receives asynchronous data at step 402. The asynchronous data is shifted into a DMA FIFO at step 404. A timer is reset at step 406. If the timer has expired at step 408, then the data from the FIFO is transferred to a host memory via a DMA controller at step 410. The timer is programmable with typical expiration times of 20 to 200 ms for CDMA, PHS and PDC applications. If the timer at step 408 has not expired, then at step 412, a decision is made to whether the DMA FIFO contains x valid bytes. X can be a number less than or equal to the DMA FIFO size minus 1. If the DMA FIFO has x valid bytes, the data is then flushed from the FIFO to the host memory via the DMA controller at step 410. If at step 412, the DMA FIFO does not contain x valid bytes, the method proceeds to step 402 where the asynchronous data is received by the USART.

Figure 6:
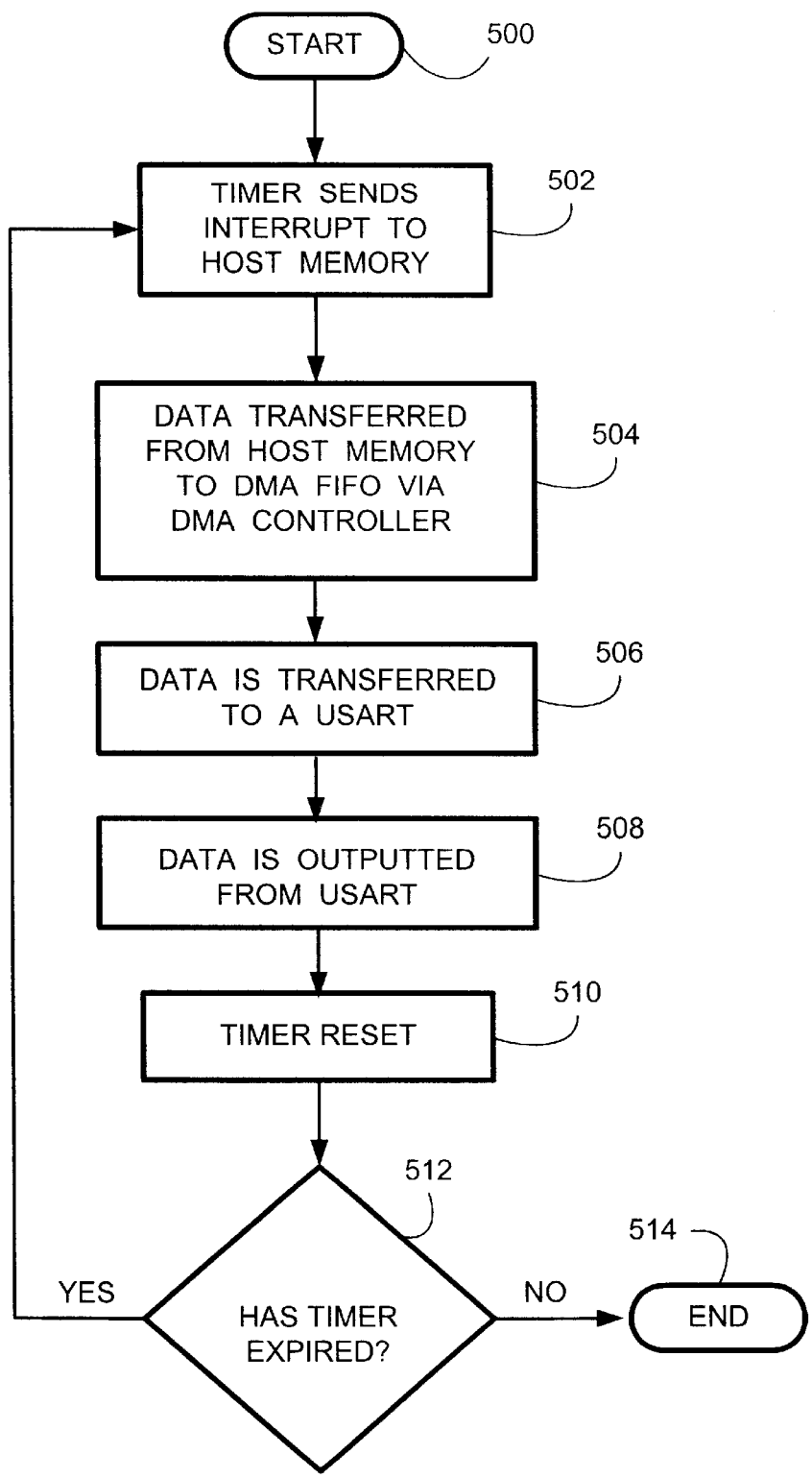
FIG. 6 is a flowchart for transmitting asynchronous high speed data according to the present invention.

FIG. 6 is a flowchart for transmitting high speed asynchronous for wireless communications. The method starts at 500. A timer sends an interrupt request to a host memory at step 502. The timer is programmable with typical expiration times of 20 to 200 ms. Data is then transferred from the host memory to a DMA FIFO via a DMA controller at step 504. The data is then transferred to a USART at step 506. The data is then outputted from the USART at step 508. The timer is reset at step 510. If the timer has expired at step 512, the timer sends the interrupt request to the host memory at step 502. If the timer has not expired at step 512, the method ends at step 514.

Figure 7:
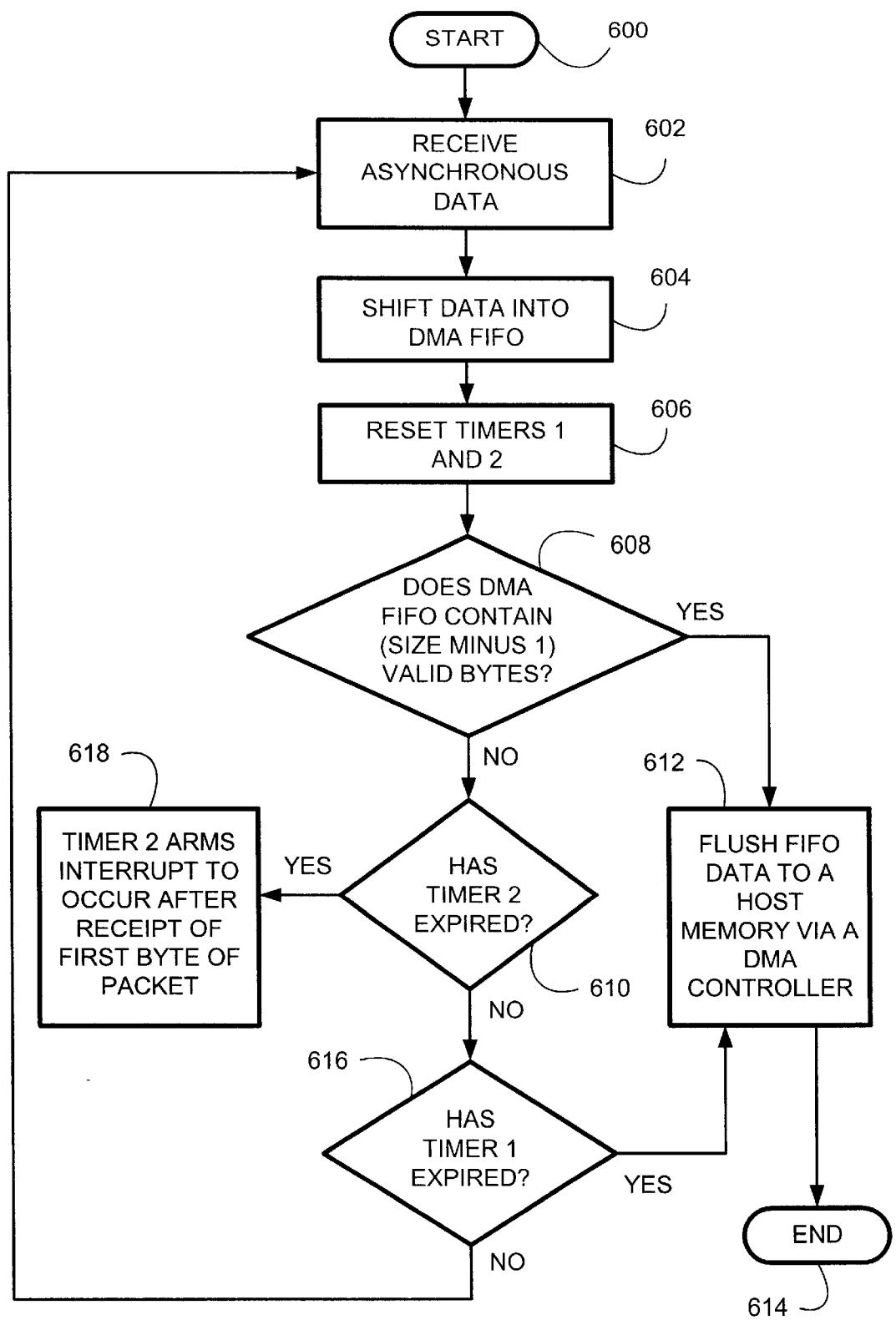
FIG. 7 is a flowchart for processing GSM data according to the present invention.

FIG. 7 is a flowchart for processing GSM data according to the present invention.

The method starts at step 600. High speed asynchronous data is received at step 602. The high speed asynchronous data is shifted into a DMA FIFO at step 604. A timer 1 and a timer are reset at step 606. At step 608, if the DMA FIFO contains x valid bytes, where x equal the DMA FIFO size minus 1, the DMA FIFO data is flushed to a host memory via a DMA controller at step 612. The method ends at step 614. However at step 608, if the DMA FIFO does not contain x valid bytes, then the method proceeds to step 610. At step 610, if the timer 2 has expired, the timer 2 arms interrupt to occur after receipt of a first byte of packet to the host memory at step 618. At step 610, if the timer 2 has not expired, the method proceeds to step 616. The timer 2 is programmable with typical expiration times of less than 20 ms for GSM applications. At step 616, if the timer 1 has expired then the high speed asynchronous data in the DMA FIFO is transferred to the host memory via the DMA controller at step 612. The timer 1 is programmable with typical expiration times of 20–200 ms for GSM applications. Once again, the method ends at step 614. If at step 616, the timer 1 has not expired, the method proceeds to step 602 where asynchronous data is received.

The disclosed embodiments are not exhaustive and are only exemplary of wireless communications systems, such as CDMA, GSM, PHS and PDC. It should be understood that the apparatus and techniques according to the present invention can be applied to any high speed asynchronous communication system. For example, the apparatus and techniques according to the present invention could be applied to a wired network, such as fiber optic or cable land lines. Thus, according to the present invention, the use of a deep buffer USART is not required. Design and manufacturing costs and chip real estate are saved. Furthermore, a new USART or new DMA design is not required. The same DMA channel can be shared by other applications.

The foregoing disclosure and description of the invention are illustrative and explanatory thereof, and various changes in the size, shape, materials, components, circuit elements, wiring connections and contacts, as well as the details of the illustrative circuitry and construction and method of operation may be made without departing from the spirit of the invention.

We claim:

1. An apparatus for communicating high speed asynchronous data, comprising:
   a DMA controller;
   a DMA FIFO memory coupled to the DMA controller;
   a transmitter/receiver for transmitting and receiving data, the transmitter/receiver is coupled to the DMA controller via the DMA FIFO memory; and
   a timer configured to time an expiration time, the timer configured to receive a reset signal from the transmitter/receiver to start timing of the expiration time, and the timer configured to communicate a signal to the DMA controller at the end of the expiration time, such that at least one byte of information is communicated out of the DMA FIFO memory.

2. The apparatus of claim 1, wherein the transmitting and receiving data is CDMA data.

3. The apparatus of claim 1, wherein the transmitting and receiving data is PHS data.

4. The apparatus of claim 1, wherein the transmitting and receiving data is PDC data.

5. The apparatus of claim 1, wherein the timer communicates a flush signal when the DMA FIFO memory has x valid bytes, where x is less than or equal to a DMA FIFO memory size minus 1.

6. The apparatus of claim 5, wherein x=7 and the DMA FIFO memory size =8.

7. The apparatus of claim 1, further comprising a host memory coupled to the DMA controller, the host memory configured to transmit the at least one byte of information to the DMA controller when the transmitter/receiver is transmitting, and configured to receive the at least one byte of information to the DMA controller when the transmitter/receiver is receiving.

8. The apparatus of claim 7, wherein the timer provides an interrupt signal to the host memory, the interrupt signal provided concurrently with the signal.

9. The apparatus of claim 7, further comprising a PCI bus coupling the host memory and the DMA controller.

10. The apparatus of claim 1, further comprising a buffer residing in the transmitter/receiver, the buffer configured to receive the at least one byte of information from an asynchronous input, and configured to transmit the at least one byte of information received from the DMA FIFO memory.

11. The apparatus of claim 10, wherein the at least one byte of information is received by the buffet at least upon the end of the expiration time.

12. The apparatus of claim 10, wherein the buffer is one byte.

13. The apparatus of claim 10, wherein the buffer is two bytes.

14. The apparatus of claim 1, further comprising a buffer residing in the transmitter/receiver, the buffer configured to receive the at least one byte of information from the DMA FIFO memory and configured to transmit the received at least one byte of information to an asynchronous output.

15. The apparatus of claim 14, wherein the reset signal is communicated to the timer when a first byte of information is received by the DMA FIFO memory.

16. The apparatus of claim 14, wherein the buffer is one byte.

17. The apparatus of claim 14, wherein the buffer is two bytes.

18. The apparatus of claim 1, wherein the reset signal is communicated to the timer when a first byte of information is received by the DMA FIFO memory from the transmitter/receiver.

19. The apparatus of claim 1, wherein the DMA FIFO memory further comprises a status byte, the status byte corresponding to a number of bytes of information residing in the DMA FIFO memory.

20. The apparatus of claim 19, further comprising control logic configured to provide a number count stored in the status byte.

21. The apparatus of claim 1, further comprising an antenna.

22. The apparatus of claim 1, further comprising a second timer configured to time a second expiration time, configured to receive a second reset signal from the transmitter/receiver to start timing of the second expiration time when the transmitter/receiver communicates a GSM control frame, and configured to communicate a second signal at the end of the expiration time such that at least one byte of control information is communicated out of the DMA FIFO memory.

23. The apparatus of claim 22, wherein the control frame comprises GSM control information.

24. The apparatus of claim 23, further comprising a host memory coupled to the DMA controller and configured to receive the second signal from the second timer.

25. The apparatus of claim 24, wherein the second signal is an interrupt signal.

26. A method for receiving high speed asynchronous data, comprising the steps of:

(1) receiving the high speed asynchronous data into a receiver;

(2) shifting the high speed asynchronous data into a DMA FIFO memory;

(3) resetting a timer to start timing of an expiration time; and (4) transferring the high speed asynchronous data from the DMA FIFO memory to a host memory via a DMA controller at least by the end of the expiration time.

27. The method of claim 26, wherein the asynchronous data is CDMA data.

28. The method of claim 26, wherein the asynchronous data is PHS data.

29. The method of claim 26, wherein the asynchronous data is PDC data.

30. The method of claim 26, further comprising the step of transferring the high speed asynchronous data from the DMA FIFO memory to a host memory at the end of the expiration time.

31. The method of claim 26, further comprising the step of transferring the high speed asynchronous data from the DMA FIFO memory to a host memory when the DMA FIFO memory includes x valid bytes, where x is less than or equals a DMA FIFO memory size minus 1.

32. The method of claim 31, wherein x=7, and the DMA FIFO memory size =8.

33. The method of claim 26, further comprising the steps of:

receiving a GSM control frame into a receiver;

shifting at least one byte of control data corresponding to the GSM control frame into the DMA FIFO memory;

resetting a second timer to start timing of a second expiration time; and transferring the at least one byte of control data from the DMA FIFO memory to a host memory via a DMA controller at least by the end of the second expiration time.

34. The method of claim 30, wherein the high speed asynchronous data is GSM data.

35. The method of claim 33, wherein the second time period is less than 20 ms.

36. A method for transmitting high speed asynchronous data, comprising the steps of:

(1) transferring the high speed asynchronous data from a host memory to a DMA FIFO memory via a DMA controller at a time certain;

(2) resetting a timer to start timing of an expiration time;

(3) shifting the high speed asynchronous data from the DMA FIFO memory to a transmitter at least by the end of the expiration time; and (4) transmitting the high speed asynchronous data.

37. The method of claim 36, wherein the high speed asynchronous data is CDMA data.

38. The method of claim 36, wherein the asynchronous data is PHS data.

39. The method of claim 36, wherein the asynchronous data is PDC data.

40. The method of claim 36, wherein the asynchronous data is GSM data.

41. The method of claim 36, further comprising the step of transmitting the high speed asynchronous data via an antenna.

42. A wireless telephone, comprising:

a DMA controller;

a DMA FIFO memory coupled to the DMA controller;

a host memory coupled to the DMA controller; and a transmitter/receiver for transmitting and receiving data, the transmitter/receiver coupled to the DMA controller via the DMA FIFO memory; and a timer configured to time an expiration time, configured to receive a reset signal from the transmitter/receiver to start timing of the expiration time, and configured to communicate a signal to the DMA controller at the end of the expiration time such that at least one byte of information is communicated out of the DMA FIFO memory to the host memory.

43. The wireless telephone of claim 42, further comprising a buffer residing in the transmitter/receiver, the buffer configured to receive the at least one byte of information from an asynchronous input and configured to transmit the at least one byte of information received from the DMA FIFO memory.

44. The wireless telephone of claim 42, further comprising a buffer residing in the transmitter/receiver, the buffer configured to receive the at least one byte of information from the DMA FIFO memory and configured to transmit the received at least one byte of information to an asynchronous output.

45. The wireless telephone of claim 42, comprising a second timer configured to time a second expiration time, configured to receive a second reset signal from the transmitter/receiver to start timing of the second expiration time when the transmitter/receiver communicates a GSM control frame, and configured to communicate a second signal at the end of the expiration time such that at least one byte of control information is communicated out of the DMA FIFO memory.

46. The wireless telephone of claim 42, wherein the DMA FIFO memory further comprises a status byte, the status byte corresponding to a number of bytes of information residing in the DMA FIFO memory.

47. The wireless telephone of claim 46, further comprising control logic configured to provide a number count stored in the status byte.

* * * * *

UNITED STATES PATENT AND TRADEMARK OFFICE
CERTIFICATE OF CORRECTION

PATENT NO. : 6,728,795 B1
DATED : April 27, 2004
INVENTOR(S) : Farazmandnia et al.

It is certified that error appears in the above-identified patent and that said Letters Patent is hereby corrected as shown below:

Column 6,
Line 25, after the phrase "received by the", delete the word "buffet", and substitute therefor -- buffer --.

Column 7,
Line 50, after the word "controller", delete the phrase "at a time certain".

Signed and Sealed this

Sixth Day of July, 2004

JON W. DUDAS
*Acting Director of the United States Patent and Trademark Office*